United States Patent Office

3,258,309
Patented June 28, 1966

3,258,309
PROCESS FOR STABILIZING ANHYDROUS PERCHLORIC ACID AND COMPOSITION AND VESSEL CONTAINING SAME
Robert D. Stewart, La Habra, Martin A. Prieto, Whittier, and Stanley E. Gordon, Pico-Rivera, Calif., assignors to American Potash and Chemical Corporation, Los Angeles, Calif., a corporation of Delaware
No Drawing. Filed Sept. 3, 1963, Ser. No. 306,656
10 Claims. (Cl. 23—152)

The present invention relates to the preparation of stable anhydrous perchloric acid and to stabilized compositions of anhydrous perchloric acid.

Perchloric acid is known to enjoy wide utility as an analytic reagent, in electropolishing baths, as a catalyst for such processes as the acetylation of cellulose, and as a reactant in the preparation of miscellaneous metallic perchlorates, as a source of perchlorate ions for various organic perchlorates, as an oxidizing agent, and as an oxidizer for rocket fuels.

Generally, considerable difficulty has been experienced in using anhydrous perchloric acid for any of these uses because it rapidly decomposes, as evidenced by its changing from a clear water-white, mobile liquid to a yellow colored liquid which later deepens to a reddish-brown. At this point, oxygen and chlorine oxide gases begin to evolve from the acid. This evolution of gas continues until a final product consisting essentially of the monohydrate of the perchloric acid remains. This monohydrate is a crystalline solid melting at 50° C., while anhydrous perchloric acid is a liquid with a melting point of −112° C. During this decomposition process, there is considerable danger of an explosion taking place.

The surprising discovery now has been made that the application of gas pressure to the surface of the liquid anhydrous perchloric acid stabilizes it against the decomposition just described. Moreover, it also has been discovered that the addition of certain organic compounds to the liquid anhydrous perchloric acid further aids in stabilizing it against decomposition.

Specifically, it has been discovered that the application of oxygen gas pressure to the surface of the acid retards the rate of color formation and subsequent decomposition. The effectiveness of this method of stabilization, which advantageously does not introduce a foreign material into the acid and does not increase the rate of evaporation of the acid, varies with the oxygen pressure and temperature used. Generally speaking, the period of time during which the acid is effectively stabilized by oxygen pressure is directly proportional to the oxygen pressure and inversely proportional to the temperature of the acid. Anhydrous perchloric acid can be stabilized over temperatures ranging from its freezing point to about 40° C., using oxygen pressures of 0 pounds per square inch gauge (oxygen pressure equal to normal atmospheric pressure) up to 1000 pounds per square inch gauge or even more if desired. It is even possible to use oxygen pressures which are slightly less than atmospheric, if desired. Preferably, the temperature of the acid does not exceed about 30° C. Within the preferred temperature range, satisfactory stabilization can be realized with oxygen pressures ranging from about 5 pounds per square inch gauge to about 100 pounds per square inch gauge.

It has been discovered that certain organic compounds containing a nitrile, carbonyl, or amide group, and preferably at least one chloro substituent, effectively inhibit the decomposition of anhydrous perchloric acid for long periods of time. These stabilizing agents exert a particularly powerful stabilizing effect when utilized in combination with oxygen over-pressure on the surface of the anhydrous perchloric acid.

While this invention is not limited to any theory, it is believed that the oxygen pressure over the anhydrous perchloric acid acts to reverse the equilibrium of the decomposition reaction. This is believed to be so since one of the decomposition products is oxygen.

While applicants do not intend to be limited to any theory, it is possible that the stabilizing agents which are added to the anhydrous perchloric acid are converted to some other unknown species, which does the actual stabilizing. The term "stabilizing agent" as used throughout the specification and in the appended claims, is intended to include not only the particular herein-described organic compounds which are recommended for addition to the anhydrous perchloric acid, but also any species resulting when these compounds are added to the acid.

In order to compare the inhibiting effect of various stabilization procedures, the measure of stabilization defined below is used. Anhydrous perchloric acid, either stabilized or unstabilized, undergoes certain specific changes with time during storage. The initially colorless acid first develops a yellowish color, this color then deepens to reddish-brown to almost black. At this latter point, gaseous products consisting primarily of oxygen and oxides of chlorine, are produced and begin to escape from the acid.

In the examples below, the "induction period" is a measure of the amount of stabilization achieved. The "induction period" is defined as the time from the beginning of the test (starting with water-white anhydrous acid) to the point at which gas evolution begins or the acid has achieved a color which is normally associated with gas evolution. Using this standard, acid stability is directly related to the length of the induction period with longer induction periods indicating greater stability. In general, the induction period of a particular stabilized acid shortens rapidly with increasing temperature.

The effect of increased temperature can be offset at least to some extent by increasing the quantity of stabilizing agent. The maximum amount of stabilizing agent which can be admixed with the anhydrous perchloric acid is dependent upon the maximum amount of additive which can be tolerated for the intended use. For some uses, it may be possible to use as much as 95% or more of stabilizing agent by weight based on the total weight of the mixture, while for other uses only 5% by weight or less of the agent can be tolerated.

In the specification, claims and following specific examples, all parts and percentages are by weight unless otherwise indicated. The following examples are provided in order that those skilled in the art may better understand how the present invention may be carried into effect. The following examples are provided to further illustrate and not to limit the invention.

*Example I*

This example illustrates and establishes the induction period for unstabilized anhydrous perchloric acid at 25° C.

4.5 grams of anhydrous perchloric acid is maintained under ambient air pressure at 25° C. The evolution of gas from the anhydrous perchloric acid is observed to begin after a period of 44.4 hours. Thus, the induction period for unstabilized acid under ambient air pressure and a temperature of 25° C. is 44.4 hours.

*Example II*

This example is illustrative of the stabilization of anhydrous perchloric acid by oxygen over-pressure without the addition of a stabilizing agent to the acid.

A 4.5 gram sample of anhydrous perchloric acid is maintained under 15 pounds per square inch gauge oxygen pressure at 25° C. The progress of the decomposition is measured by color development, and the induction period for this sample is observed to be 160 hours.

*Example III*

This example is illustrative of the stabilization of anhydrous perchloric acid by the addiiton of a stabilizing agent to the acid without the use of oxygen overpressure.

In the following table, a number of storage stability tests are listed. These tests are conducted using anhydrous perchloric acid which is water-white at the beginning of each test.

STORAGE STABILITY TESTS ON ANHYDROUS PERCHLORIC ACID CONTAINING SELECTED ADDITIVES

| Test No. | Wt. Acid (g.) | Additive (Wt. Percent) | Temp. (° C.) | Induct. Period (hrs.) [a] | Stabil. Factor [b] |
|---|---|---|---|---|---|
| 1 | 2.21 | $NO_2ClO_4$ (19.6) | 45 | 9.2 | 2.2 |
| 2 | 3.26 | $CH_2ClCN$ (3.30) | 25 | 1997 | 44.9 |
| 3 | 3.62 | $CH_2ClCN$ (3.0) | 44.1 | 845 | 201.1 |
| 4 | 3.80 | $CCl_3CONH_2$ (2.50) | 44.0 | 31.0 | 7.4 |
| 5 | 3.45 | $CH_2ClCOCH_2Cl$ (3.13) | 45 | 1,997.0 | 475.5 |
| 6 | 3.73 | $CCl_3COCCl_3$ (2.95) | 45 | 440.5 | 104.9 |
| 7 | 4.50 | $CH_3CN$ (2.97) | 44.0 | 31.6 | 7.5 |

[a] Induction period defined as time from start of test to incipient oxygen evolution.

[b] Stabilization factor = $\dfrac{\text{Induction Period for Stabilized Acid}}{\text{Induction Period for Unstabilized Acid}}$

*Example IV*

This example is illustrative of the stabilization of anhydrous perchloric acid by the combination of oxygen over-pressure and an added stabilization agent.

A 4.5 gram sample of anhydrous perchloric acid containing 3% by weight of 1,3-dichloro-2-propanone is maintained under 15 p.s.i.g. oxygen pressure at 25° C. The progress of the decomposition is measured by color development and the induction period is found to be substantially longer than that obtained using either oxygen over-pressure or added stabilizing agents alone.

Compounds which are effective in stabilizing anhydrous perchloric acid against decomposition include:

(1) Alkanones and chloroalkanones having the general formula:

Typical alkanones and chloroalkanones include, for example,

Acetone,
1-chloro-2-propanone,
1,1,1,3,3,3-hexachloro-2-propanone,
1,3-dichloro-2-propanone,
1,1,3,3-tetrachloro-2-propanone,
1-chloro-2-butanone,
1,1-dichloro-2-hexanone,
3-pentanone, and
1,4-dichloro-2-butanone;

(2) Alkanenitriles and chloroalkanenitriles having the general formula:

Typical alkanenitriles and chloroalkanenitriles include, for example,

Acetonitrile,
2-chloro-1-ethanenitrile,
3,3-dichloro-1-propanenitrile,
5-chloro-1-pentanenitrile,
1-butanenitrile, and
2,2,2-trichloro-1-ethanenitrile; and (3) Alkanamides and haloalkanamides having the general formula:

Typical alkanamides and haloalkanamides include, for example,

Trichloroacetamide,
butanamide,
5-chloropentanamide,
acetamide,
3-chloropropanamide,
pentachloropropanamide, and
2,2-dichloropentanamide.

The substituents R and $R_1$ in the above formulas are lower alkyl radicals containing from about 1 to 4 carbon atoms. If these alkyl radicals contain chlorine atoms, the chlorine atoms can replace any or all of the hydrogen atoms attached to these alkyl substituents.

The preferred stabilizing agents include those wherein the alkyl substituent is methyl containing from 0 to 3 chlorine atoms.

The stabilizing agents are added to the anhydrous perchloric acid according to the present invention in quantities ranging from about 0.1% to about 95% by weight of the mixture, and preferably, where the acid is to be used as a rocket propellant, in an amount ranging from about 0.5% to about 5% by weight.

The anhydrous perchloric acid can contain minor amounts of other ingredients which do not adversely affect the stability of the acid.

The nature of the vessel within which the stabilized anhydrous perchloric acid is contained is not critical so long as it provides for the maintenance of oxygen pressure, if oxygen is to be used, and is inert to the corrosive perchloric acid itself.

As will be understood by those skilled in the art, what has been described are the preferred embodiments of the invention. However, many modifications, changes, and substitutions can be made therein without departing from the scope and spirit as defined in the following claims.

What is claimed is:

1. An anhydrous perchloric acid composition comprising a mixture of substantially anhydrous perchloric acid and an effective amount of a stabilizing agent selected from the group consisting of alkanone, chloroalkanone, alkanenitrile, chloroalkanenitrile, alkanamide and chloroalkanamide.

2. Process for stabilizing anhydrous perchloric acid comprising admixing substantially anhydrous perchloric acid with an effective amount of a stabilizing agent selected from the group consisting of alkanone, chloroalkanone, alkanenitrile, chloroalkanenitrile, alkanamide and chloroalkanamide.

3. Process for stabilizing anhydrous perchloric acid comprising:
admixing substantially anhydrous perchloric acid with an effective amount of a stabilizing agent selected from the group consisting of alkanone, chloroalkanone, alkanenitrile, chloroalkanenitrile, alkanamide and chloroalkanamide
and maintaining said mixture under an atmosphere consisting essentially of oxygen.

4. An anhydrous perchloric acid composition comprising a mixture of substantially anhydrous perchloric acid and an effective amount of a stabilizing agent comprising 1,3-dichloro-2-propanone.

5. An anhydrous perchloric acid composition comprising a mixture of substantially anhydrous perchloric acid and an effective amount of a stabilizing agent comprising hexachloroacetone.

6. An anhydrous perchloric acid composition comprising a mixture of substantially anhydrous perchloric acid and an effective amount of acetonitrile as a stabilizing agent.

7. An anhydrous perchloric acid composition comprising a mixture of substantially anhydrous perchloric acid and a stabilizing amount of trichloroacetamide.

8. An anhydrous perchloric acid composition comprising a mixture of substantially anhydrous perchloric acid and a stabilizing amount of chloroacetonitrile.

9. A closed vessel containing liquid anhydrous perchloric acid and an atmosphere consisting essentially of oxygen.

10. A closed vessel containing:
a liquid composition comprising a mixture of substantially anhydrous perchloric acid and an effective amount of a stabilizing agent selected from the group consisting of alkanone, chloroalkanone, alkanenitrile, chloroalkanenitrile, alkanamide and chloroalkanamide; and
an atmosphere consisting essentially of oxygen.

No references cited.

OSCAR R. VERTIZ, *Primary Examiner.*

E. STERN, *Assistant Examiner.*